United States Patent
Bajorat et al.

(10) Patent No.: US 9,359,086 B2
(45) Date of Patent: Jun. 7, 2016

(54) PROFILED STRIP AS A FIRE INDICATION DEVICE IN AN AIRCRAFT

(71) Applicant: Airbus Operations GmbH, Hamburg (DE)

(72) Inventors: Falk Bajorat, Oldendorf (DE); Damian McNally, Hamburg (DE); Christoph Augenstein, Hamburg (DE); Dirk Scheffler, Tann (DE)

(73) Assignee: Airbus Operations GmbH, Hamburg (DE)

( * ) Notice: Subject to any disclaimer, the term of this patent is extended or adjusted under 35 U.S.C. 154(b) by 248 days.

(21) Appl. No.: 14/107,147

(22) Filed: Dec. 16, 2013

(65) Prior Publication Data

US 2014/0166810 A1   Jun. 19, 2014

Related U.S. Application Data

(60) Provisional application No. 61/738,499, filed on Dec. 18, 2012.

(30) Foreign Application Priority Data

Dec. 18, 2012 (EP) .................................. 12 197 901

(51) Int. Cl.
*B64D 45/00* (2006.01)
*A62C 3/08* (2006.01)
*E06B 5/16* (2006.01)
*B64D 11/00* (2006.01)
*B64C 1/14* (2006.01)

(52) U.S. Cl.
CPC .............. *B64D 45/00* (2013.01); *B64C 1/1407* (2013.01); *B64D 11/00* (2013.01); *A62C 3/08* (2013.01); *B64D 2045/009* (2013.01); *E06B 5/162* (2013.01)

(58) Field of Classification Search
CPC .............. A62C 3/00; A62C 3/08; B64C 1/14; B64C 1/1407; B64D 11/00; B64D 45/00; B64D 2014/009; E06B 5/00; E06B 5/10; E06B 5/16
USPC ......... 116/70, 101, 102, 103, 214; 244/129.2, 244/129.4, 129.5; 277/319; 52/204.1; 454/195
See application file for complete search history.

(56) References Cited

U.S. PATENT DOCUMENTS

| 5,791,282 | A | * | 8/1998 | Christ-Janer | G08B 7/06 116/214 |
| 6,336,293 | B1 | | 1/2002 | Kamimura | |
| 6,672,195 | B1 | * | 1/2004 | Plattner | B64C 1/1469 89/36.04 |
| 6,983,566 | B2 | * | 1/2006 | Laun | H02B 1/38 312/223.2 |
| 8,460,419 | B1 | * | 6/2013 | Hobbs | B01D 46/10 454/195 |

(Continued)

FOREIGN PATENT DOCUMENTS

| EP | 1 371 555 A2 | 12/2003 |
| EP | 1 470 838 A1 | 10/2004 |

(Continued)

*Primary Examiner* — R. A. Smith
(74) *Attorney, Agent, or Firm* — Lerner, David, Littenberg, Krumholz & Mentlik, LLP

(57) ABSTRACT

A door for a storage compartment of an aircraft includes a door leaf and a profiled strip connected to an edge of the door leaf. The profiled strip includes openings that provide a path for gas exchange such that smoke from the storage compartment is detectable outside of the storage compartment by passing the profiled strip.

14 Claims, 3 Drawing Sheets

(56) References Cited

U.S. PATENT DOCUMENTS

| | | | |
|---|---|---|---|
| 8,496,720 B2 * | 7/2013 | Bordin | B01D 46/0005 454/195 |
| 2004/0211150 A1 | 10/2004 | Bobenhausen | |
| 2008/0244999 A1 * | 10/2008 | Westermann | E06B 1/28 52/204.1 |
| 2012/0003914 A1 | 1/2012 | Warner | |
| 2014/0123571 A1 * | 5/2014 | Swain | B64D 11/0023 52/79.1 |

FOREIGN PATENT DOCUMENTS

| | | | | |
|---|---|---|---|---|
| EP | 1 500 772 A1 | | 1/2005 | |
| GB | 2 239 309 A | | 6/1991 | |
| GB | 2253477 A | * | 9/1992 | E06B 7/02 |
| GB | 2256704 A | * | 12/1992 | E06B 7/10 |
| JP | 2005226257 A | * | 8/2005 | E06B 7/10 |
| JP | 2009287339 A | * | 12/2009 | E06B 7/02 |

* cited by examiner

PROFILED STRIP AS A FIRE INDICATION DEVICE IN AN AIRCRAFT

CROSS-REFERENCE TO RELATED APPLICATIONS

This application claims the benefit of the filing date of U.S. Provisional Patent Application No. 61/738,499 filed Dec. 18, 2012, the disclosure of which is hereby incorporated herein by reference.

FIELD OF THE INVENTION

The invention relates to a door for a storage compartment of an aircraft, a profiled strip for a door and a use of a profiled strip in an aircraft.

BACKGROUND OF THE INVENTION

Usually, storage compartments in an aircraft such as stowages, cupboards and cabinets for example for storing cloths, kitchen equipment or other objects used in an aircraft, are closed by a door with a vertical or horizontal hinge. When those objects start to burn or a smoldering fire develops in or behind the storage compartment, it is important that this fire is detected as fast as possible. For example, this may be done with an electronic smoke detection device inside the compartment.

Recently, the critical volume of a compartment, which has to be provided a smoke detection device has been changed from 1.4 m$^3$ to 0.7 m$^3$. Before this policy change, approximately 5% of storage compartments in dead end areas have to be equipped with a smoke detection device. After the change, approximately 50% of storage compartments have to be equipped with an additional smoke detection device.

Another solution for a smoke detection device or smoke indication device is to incorporate an air grill in an upper portion of a compartment door to enable a quick escape of smoke from inside of the compartment into the visible area of the cabin (for example to aisles or seat zones).

US 2004 211 150 A1 and DE 103 18 975 B3 describe a method and device for combating fire in enclosed spaces aboard an aircraft, which is based on a gap or leak that is provided for permitting smoke to pass out of an enclosed space when a beginning fire generates smoke inside the enclosed space for an early visual smoke detection and thus of a beginning fire.

BRIEF SUMMARY OF THE INVENTION

An aspect of the invention provides a simple and reliable smoke/fire indication device for an aircraft.

An aspect of the invention relates to a door for a storage compartment of an aircraft. The storage compartment may be a stowage, a cupboard, a cabin supply module or a cabinet. The aircraft may be a passenger aircraft, for example a passenger plane.

According to an embodiment of the invention, the door comprises a door leaf; and a profiled strip connected to an edge of the door leaf. The profiled strip comprises openings that provide a path for gas exchange such that smoke from the storage compartment is detectable outside of the storage compartment by passing the profiled strip. In such a way, the door may be a universal smoke detection device for storage compartments, for example cabin compartments in an aircraft.

When the door is provided in a cabin area of the aircraft, the detection of smoke by humans, like passengers or the crew, is enabled. For example, the door enables a quick escape of smoke caused by fire.

The openings (which together with the profiled strip may be aligned vertically) may provide a vertical gap, for example beside a door hinge, smoke may easily and quickly escape into the cabin area. In particular, smoke that is generated in the lower portion of the storage compartment, for example under a shelf, may directly escape into the cabin area without having to ascend to reach an air grill.

A vertical gap may provide a direct opening of each sub-compartment of the compartment into the cabin area. For example, a storage compartment may be separated by shelves behind the door into sub-compartments. Therefore, smoke can directly protrude into the cabin area.

Additionally, with the profiled strip besides the door leaf, a big and non-aesthetic air grill in the upper portion of each compartment door may be avoided.

The profiled strip may be incorporated in each compartment door with low modification work load. A large number of storage compartments may be provided with the door, since only the old door without the profiled strip has to be replaced by the door with the profiled strip. No additional smoke detection sensor has to be included into the storage compartment. The other part of the storage compartment need not be modified.

According to an embodiment of the invention, the door comprises a hinge for attaching the door leaf to a door frame. The profiled strip may interconnect the hinge with the door leaf, i.e. may be arranged between the hinge and the door leaf.

According to an embodiment of the invention, the openings comprise longitudinal openings that are arranged in a row parallel to the edge of the door leaf, and, for example, parallel to the hinge. For example, a (vertical or horizontal) gap may be formed in the profiled strip by arranging a number of openings along the profiled strip. For example, the extension of the openings along a longitudinal direction of the profiled strip is larger than the extension of the material of the profile strip between the openings. Furthermore, an extension of the openings in a cross direction of the longitudinal strip may by more than 5% of the overall extension of the profiled strip in this direction. The openings may have an extension in the longitudinal direction that is larger than an extension in the cross direction.

According to an embodiment of the invention, the openings are provided along the complete profiled strip (along the longitudinal direction). In particular, in this case a gap (or a row of openings) may be formed that nearly reaches from one end of the profiled strip to the other end. Thus, smoke may pass through the profiled strip at any area of the profiled strip.

According to an embodiment of the invention, the profiled strip further comprises a first side wall for attaching the hinge and a second side wall for attaching the door leaf. For example, these side walls may comprise holes that may be used for attaching these members of the door.

According to an embodiment of the invention, the profiled strip further comprises a front wall interconnecting the first side wall and the second side wall, wherein openings are provided in the front wall and/or the profiled strip further comprises a back wall interconnecting the first side wall and the second side wall of the profiled strip. It has to be understood that a single wall interconnecting the side walls may be seen as either a front wall or a back wall. A front wall may interconnect the side walls at an outer side or an outer surface of the door leaf. A front wall may be substantially flush with the outer side of the door leaf. A back wall may interconnect the side walls at an inner side or inner surface of the door leaf. A back wall may be substantially flush with the inner side of the door leaf.

With only a single back or front wall, the profiled strip may comprise a substantially U-shaped profile. With a back wall and a front wall, the profiled strip may have a substantially rectangular profile.

According to an embodiment of the invention, at least some of the openings are provided in the front wall and/or the back wall. For example, the openings in the back wall and the openings in the front wall may have the same shape and/or may face each other.

According to an embodiment of the invention, the front wall and/or the back wall comprise two rows of openings. The front wall and/or the back wall may comprise one row of openings and the other wall may comprise two rows or more. However, it is also possible, that the openings are arranged in only one row.

According to an embodiment of the invention, the profiled strip further comprises an intermediate wall interconnecting the front wall and the back wall. For example, the intermediate wall may be located between the two rows of openings.

According to an embodiment of the invention, the front wall and/or the back wall comprises a deepened middle part, which comprises at least some of the openings. In such a way, objects inside and/or outside of the compartment may not block the openings, such that smoke is prevented from passing through the profiled strip.

According to an embodiment of the invention, the front wall comprises a T-shaped part extending over the openings in the front wall. In such a way, the openings in the front wall need not be directly visible by a person standing in front of the door, since the openings may be covered by the T-shaped part. However, smoke passing through the profiled strip may pass around the T-shaped member.

According to an embodiment of the invention, the profiled strip provides an edge protection profile (at one side wall) for the door leaf, which edge protection profile has a same profile as an edge protection profile surrounding the door leaf at other edges of the door leaf. The edge protection profile (of the profiled strip and/of the other edges of the door leaf) may have a U-formed shape, i.e. may have two feet encompassing the edge of the door leaf.

According to an embodiment of the invention, a surface of the T-shaped part is flush with a surface part of the front wall attached to the side walls. For example, the T-shaped part may be flush with a foot of the edge protection profile.

According to an embodiment of the invention, the profiled strip is made from aluminum. For example, the profiled strip may be formed by bar extrusion and by milling the openings after the bar extrusion.

A further aspect of the invention relates to a profiled strip for a door as described in the above and in the following. The profiled strip may comprise two side walls, a front wall and a back wall. The front wall and the back wall may have openings that provide a path for gas exchange through the profiled strip, such that smoke can pass the profile strip. In other words, the profiled strip may have a substantially rectangular shape with side walls for attaching the profiled strip between two members such as a door leaf and a hinge and with a front wall and a back wall, which have gaps or openings through which smoke may pass.

A further aspect of the invention relates to a use of a profiled strip as described in the above and in the following as a smoke indication device and/or smoke detection device. As already mentioned, such a strip may be connected between a door and a hinge and smoke developing behind the door may pass the profiled strip and may easily be detected in front of the door.

These and other aspects of the invention will be apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings.

In principle, identical parts are provided with the same reference symbols in the figures.

DETAILED DESCRIPTION

Figure 1:
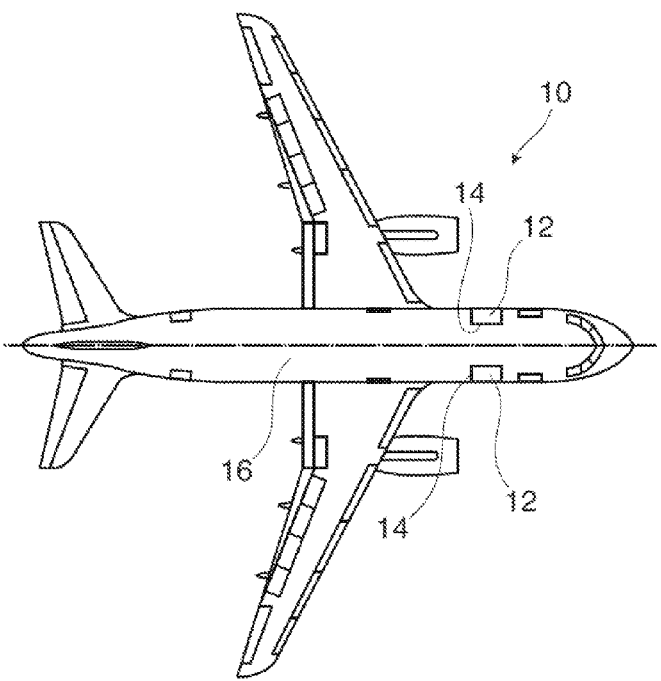
FIG. 1 schematically shows an aircraft with doors according to an embodiment of the invention.

FIG. 1 shows an aircraft 10 that (as schematically shown) comprises a number of storage compartments 12 that are closed by doors 14. A person in the cabin space 16 of the aircraft 10 may open a door 14 and may access the storage space behind the door.

Figure 2:
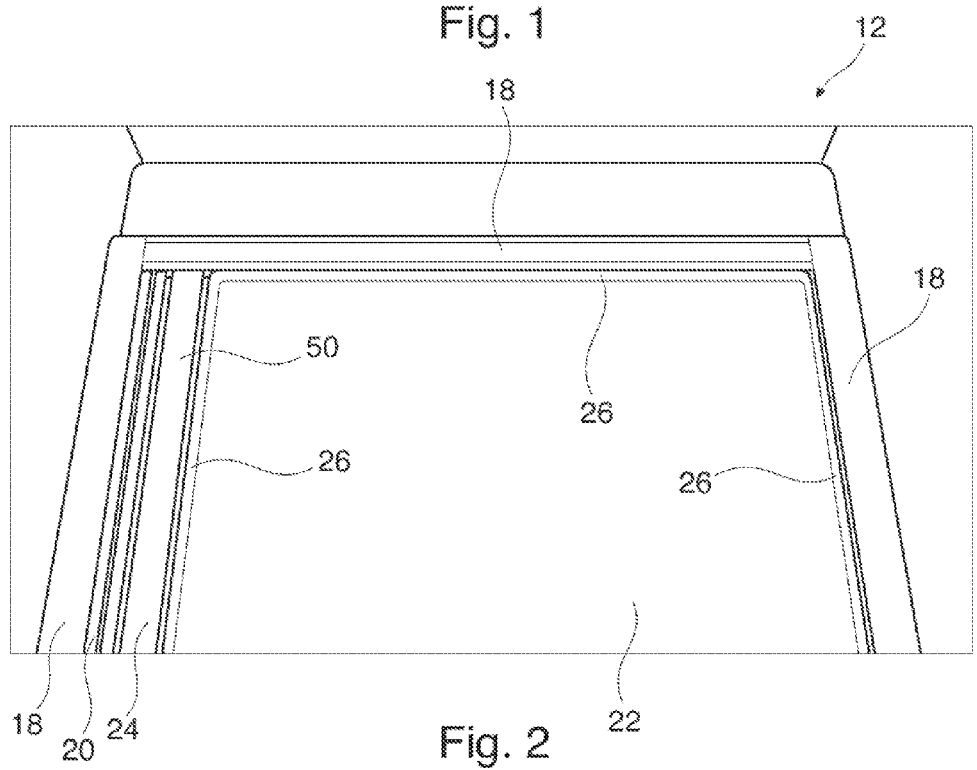
FIG. 2 shows a three-dimensional view of a door according to an embodiment of the invention.
Figure 3:
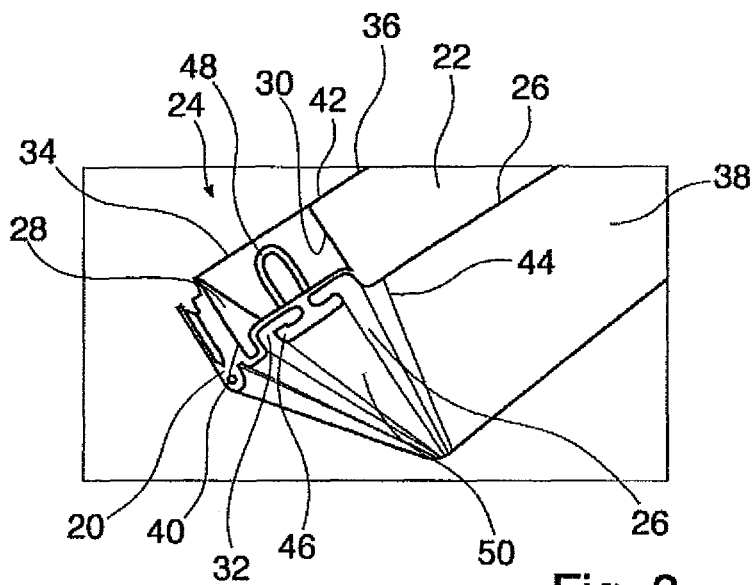
FIG. 3 shows another three-dimensional view of the door of FIG. 2.
Figure 4:
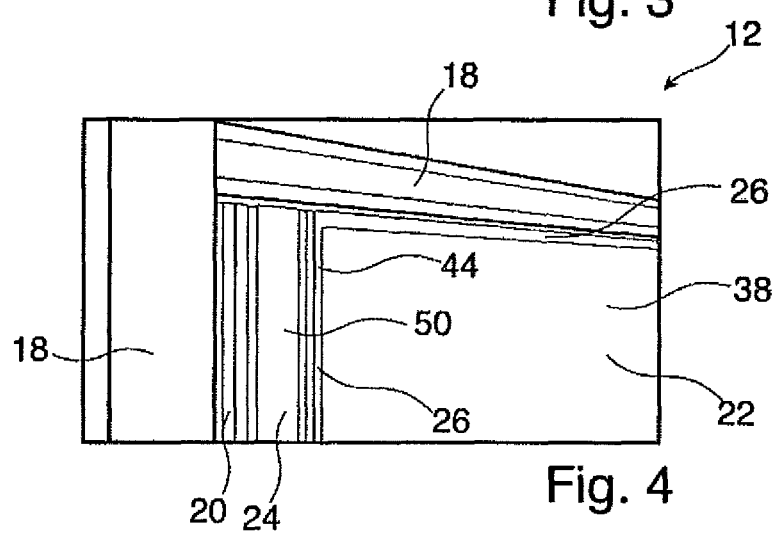
FIG. 4 shows another three-dimensional view of the door of FIG. 2.
Figure 5:
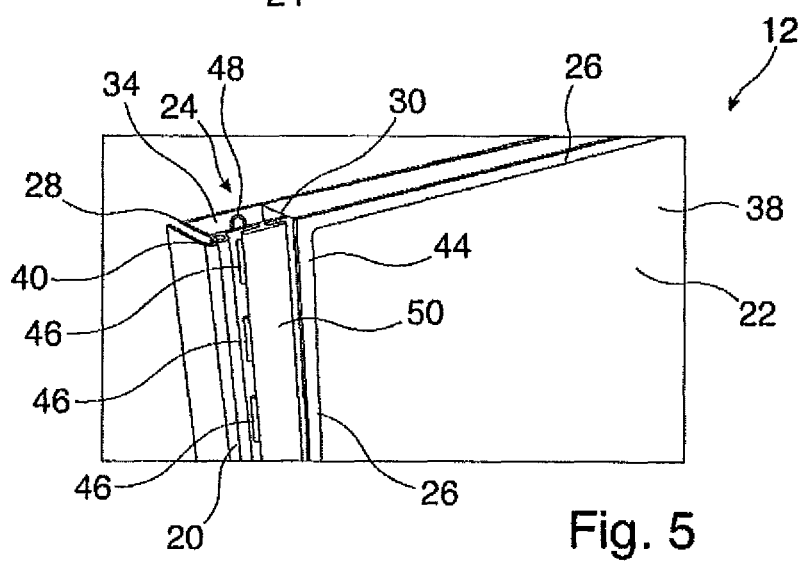
FIG. 5 shows another three-dimensional view of the door of FIG. 2.

FIG. 2 shows a three-dimensional view of door 14, which is also shown in FIGS. 3 to 5 from different directions. The door 14 is positioned in a frame 18 and comprises a hinge 20 connected to the frame 18. The hinge 20 may be aligned vertically and may be a strap hinge, which, for example, is manufactured from aluminum.

The door 14 comprises a door leaf 22 that is interconnected via a profiled strip 24 with the hinge 20. The door leaf 22 is a substantially rectangular member that, for example, is manufactured from plastic material and/or from a honey comp panel. The door leaf is surrounded by a substantially U-shaped edge protection profile 26 that at the edge facing the hinge 20 is provided by the profiled strip 24.

The profiled strip 24 comprises two parallel side walls 28, 30 that are used for connecting the profiled strip 24 to the hinge 20 (side wall 28) and to one edge of the door leaf 22 (side wall 30). The side walls 28, 30 are connected via a front wall 32 and a back wall 34, which are substantially orthogonal to the side walls 28, 30. In such a way, the profiled strip 24 has a substantially rectangular profile.

The back wall 34 is in the same plane as the inner surface 36 of the door leaf 22. The front wall is substantially in the same plane as the outer surface 38 of the door leaf 22. Also the hinge axis 40 of the hinge 20 is substantially in the same plane as the outer surface 38 of the door leaf 22.

One foot 42 of the edge protection profile 26 is an extension of the back wall 34, another foot 44 of the edge protection profile 26 is an extension of the front wall 32. The edge protection profile 26 may be part of the profiled strip 24, i.e.

the profiled strip 24 and the edge protection profile 26 may be a one-piece member (as well as the other components of the profiled strip like the side walls 28, 30, the front wall 32, the back wall 34 and an intermediate wall).

The front wall 32 comprises a row or a first plurality of openings 46 (as shown in FIG. 3, two rows) that extend along the longitudinal direction of the profiled strip 24. The back wall 34 comprises a row or a second plurality of openings 48 that also extend along the longitudinal direction of the profiled strip 24. Smoke from the inside of the compartment 12 may leave the compartment by passing through the openings 48, 46 of the profiled strip 24.

The front wall 32 comprises a T-shaped member 50 that is connected to a deepened part of the front wall 32 and that covers the openings 46. The surface of the T-shaped member 50 is flush with the foot 44 of the edge protection profile 26 and with the outer surface 38.

Figure 6:
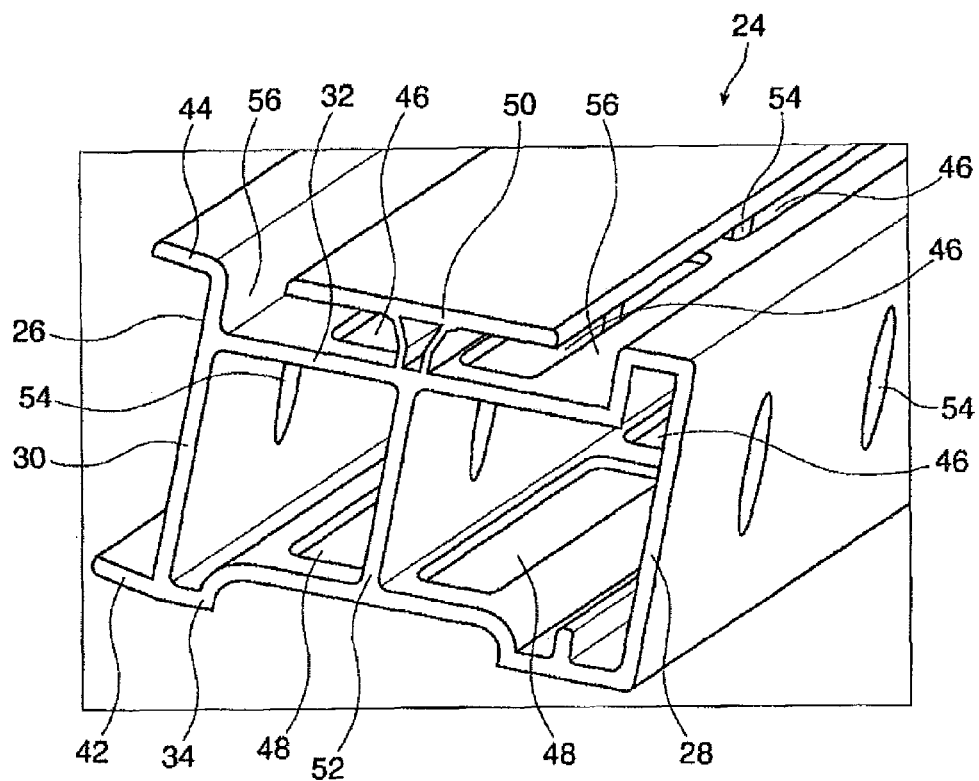
FIG. 6 shows a three-dimensional view of a profiled strip according to an embodiment of the invention.
Figure 7:
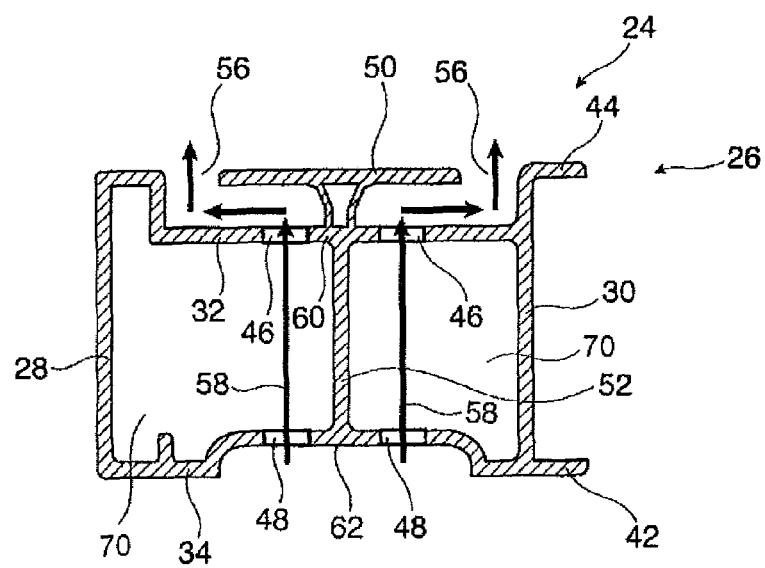
FIG. 7 shows a cross-sectional view of the profiled strip of FIG. 6.

FIG. 6 shows a three-dimensional view of an embodiment of a profiled strip 24. FIG. 7 shows a cross-sectional view of the profiled strip 24 of FIG. 6. The profiled strip of FIGS. 6 and 7 differs from the profiled strip 24 shown in FIGS. 2 to 5 in that it has an intermediate wall 52.

The intermediate wall 52 is parallel to the side walls 28, 30 and may be designed for supporting the T-shaped member 50. The back wall 34 has two rows of openings 48 that (like the openings 46 in the front wall 32) may be arranged such that the intermediate wall 52 extends between them.

As shown in FIG. 6, the side walls 28, 30 (as well as the intermediate wall 52) may have holes 54 that may be used for connecting the profiled trip 24 to the hinge 20 or to the door leaf 22. The holes 54 may be positioned in regular spaces (like the openings 46, 48).

The openings 46, 48 may have an extension of about 5 mm in a cross direction of the profiled strip 24. In the longitudinal direction, the openings 46, 48 may have an extension that is much larger.

The gap 56 between the T-shaped member 50 and one of the side walls 28, 30 may be about 3.5 mm.

As may be seen from FIG. 7, smoke 58 may reach the inner space 70 of the profiled strip 24 through the openings 48 and may leave the inner space 70 through the openings 46 and the gaps 56.

The front wall 32 comprises a deepened middle part 60 to which the T-shaped member 50 and the intermediate wall 52 are connected. The openings 46 are provided in the deepened middle part 60. Also the back wall 34 comprises a deepened middle part 62 to which the intermediate wall 52 is connected. The openings 48 are provided in the deepened middle part 62.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A door for a storage compartment of an aircraft, comprising:
    a door leaf; and
    a profiled strip connected to an edge of the door leaf;
    wherein the profiled strip comprises a first plurality of openings providing a path for gas exchange such that smoke from the storage compartment is detectable outside of the storage compartment by passing the profiled strip,
    a hinge for attaching the door leaf to a door frame;
    wherein the profiled strip interconnects the hinge and the door leaf;
    wherein the profiled strip further comprises:
        a first side wall for attaching the hinge;
        a second side wall for attaching the door leaf;
        a front wall interconnecting the first side wall and the second side wall;
    wherein the first plurality of openings is provided in the front wall.

2. The door of claim 1, wherein the first plurality of openings comprises a plurality of longitudinal openings arranged in a row parallel to the edge of the door leaf.

3. The door of claim 1, wherein the first plurality of openings are provided along the complete profiled strip.

4. The door of claim 1, wherein the profiled strip further comprises:
    a back wall interconnecting the first side wall and the second side wall of the profiled strip;
    wherein a second plurality of openings is provided in the back wall.

5. The door of claim 1, wherein at least one of the front wall and a back wall comprises two rows of openings.

6. The door of claim 1, wherein the profiled strip further comprises: an intermediate wall interconnecting the front wall and a back wall.

7. The door of claim 1, wherein at least one of the front wall and a back wall comprises a deepened middle part comprising at least some of the first or second plurality of openings.

8. The door of claim 1, wherein the front wall comprises a T-shaped part extending over the first plurality of openings in the front wall.

9. The door of claim 8, wherein a surface of the T-shaped part is flush with a surface part of the front wall attached to the side walls.

10. The door of claim 1, wherein the profiled strip provides an edge protection profile for the door leaf having a same profile as an edge protection profile surrounding the door leaf at other edges of the door leaf.

11. The door of claim 10, wherein the edge protection profile has a U-formed shape.

12. The door of claim 1, wherein the profiled strip is made from aluminum.

13. A profiled strip for a door comprising a door leaf and a hinge for attaching the door leaf to a door frame in an aircraft, wherein the profiled strip comprises first and second side walls, a front wall and a back wall;
    wherein the front wall and the back wall have a first and a second pluralities of openings providing a path for gas exchange through the profiled strip, such that smoke can pass the profiled strip
    wherein the profiled strip interconnects the hinge and the door leaf;
    wherein the profiled strip further comprises:
        a first side wall for attaching the hinge;
        a second side wall for attaching the door leaf;

a front wall interconnecting the first side wall and the second side wall;

wherein the first plurality of openings is provided in the front wall.

14. A method for indicating smoke behind a door comprising a door leaf and a hinge for attaching the door leaf to a door frame in an aircraft, the method comprising:

providing the door with a profiled strip comprising first and second side walls, a front wall and a back wall, wherein the front wall and the back wall have a first and a second pluralities of openings providing a path for gas exchange through the profiled strip, such that smoke can pass the profiled strip;

interconnecting the hinge and the door leaf by the profiled strip; and using the profiled strip as a smoke indication device, wherein the profiled strip further comprises:

a first side wall for attaching the hinge;

a second side wall for attaching the door leaf;

a front wall interconnecting the first side wall and the second side wall;

wherein the first plurality of openings is provided in the front wall.

\* \* \* \* \*